United States Patent [19]

Jones et al.

[11] Patent Number: 5,574,874
[45] Date of Patent: Nov. 12, 1996

[54] METHOD FOR IMPLEMENTING A CHECKPOINT BETWEEN PAIRS OF MEMORY LOCATIONS USING TWO INDICATORS TO INDICATE THE STATUS OF EACH ASSOCIATED PAIR OF MEMORY LOCATIONS

[75] Inventors: Jeremy O. Jones; Brian A. Coghlan; Philip O'Carroll, all of Dublin, Ireland

[73] Assignee: Tolsys Limited, Dublin, Ireland

[21] Appl. No.: 491,278

[22] Filed: Jun. 16, 1995

Related U.S. Application Data

[63] Continuation of Ser. No. 147,070, Nov. 3, 1993, abandoned.

[30] Foreign Application Priority Data

Nov. 3, 1992 [IE] Ireland ................................ 922784

[51] Int. Cl.⁶ .............................. G06F 12/00; G06F 11/00
[52] U.S. Cl. ......................... 395/376; 395/700; 395/427; 395/180; 395/561; 364/285; 364/285.2; 364/244; 364/DIG. 1
[58] Field of Search ........................... 395/182.04, 182.13, 395/182.15, 182.18, 489, 439, 375, 700, 427, 180, 600, 182.17

[56] References Cited

U.S. PATENT DOCUMENTS

| | | |
|---|---|---|
| 4,044,337 | 8/1977 | Hicks et al. . |
| 4,459,658 | 7/1984 | Gabbe et al. . |
| 4,819,232 | 4/1989 | Krings . |
| 4,823,261 | 4/1989 | Bank et al. ............................... 395/500 |
| 4,912,707 | 3/1990 | Kogge et al. ............................ 395/375 |
| 5,008,786 | 4/1991 | Thatte . |
| 5,269,017 | 12/1993 | Hayden et al. ......................... 395/575 |
| 5,293,613 | 3/1994 | Hayden et al. ......................... 395/575 |
| 5,301,309 | 4/1994 | Sugano ................................... 395/575 |
| 5,313,647 | 5/1994 | Kaufman et al. ....................... 395/700 |
| 5,355,457 | 10/1994 | Shebanow et al. ..................... 395/375 |
| 5,481,694 | 1/1996 | Chao et al. ............................. 395/439 |

FOREIGN PATENT DOCUMENTS

| | | |
|---|---|---|
| 0119806 B1 | 3/1984 | European Pat. Off. . |
| 0515166 | 11/1992 | European Pat. Off. .......... G06F 9/38 |
| 1507428 | 4/1978 | United Kingdom . |

*Primary Examiner*—Gopal C. Ray
*Attorney, Agent, or Firm*—Scully, Scott, Murphy & Presser

[57] ABSTRACT

A method for memory checkpointing which does not involve copying of data and that is virtually instantaneous involves designating the active location at a checkpoint as being the backup for the checkpoint. Until there is a new write operation after the checkpoint, this location is regarded as both the active and the backup location. At the first write operation after the checkpoint, the write is carried out to the other, previously non-designated location. Control of writing and indicating of the status of the locations is carried out by updating two binary bits for each pair of locations, namely, a first modification indicator bit and a second role indicator bit. The modification bits are stored on a resettable RAM for almost instantaneous checkpointing where the location granularity is that of a write operation. The method obviates the need for copying the contents of an active location at a checkpoint.

12 Claims, 5 Drawing Sheets

| state | | read | write | checkpoint | rollback |
|---|---|---|---|---|---|
| M | R | | | | |
| 0 | 0 | read bank A | (bank A → bank B) write to bank B state → 11 | state → 00 | state → 00 |
| 1 | 1 | read bank B | write to bank B | state → 01 | state → 00 |
| 0 | 1 | read bank B | (bank B → bank A) write bank A state → 10 | state → 01 | state → 01 |
| 1 | 0 | read bank A | write to bank A | state → 00 | state → 01 |

Truth Table for a Stable Location

Fig. 2

METHOD FOR IMPLEMENTING A CHECKPOINT BETWEEN PAIRS OF MEMORY LOCATIONS USING TWO INDICATORS TO INDICATE THE STATUS OF EACH ASSOCIATED PAIR OF MEMORY LOCATIONS

This is a continuation of application Ser. No. 07/147,070 filed on Nov. 3, 1993, now abandoned.

BACKGROUND

1. Introduction

The invention relates to memory checkpointing.

Memory checkpointing is a method of providing for return of data structures in memory to a recent consistent state if so desired. This may be required, for example, after a power failure or a system malfunction.

2. Discussion of the Prior Art

At present, checkpointing is carried out in response to a time, event or demand signal and it involves updating an extra copy of certain data structures sufficient for rollback in the event of a failure. The copy may or may not be on a separate memory circuit having an independent failure mode. For example, U.S. Pat. No. 4,459,658 describes a specific updating method involving use of a read-only access shadow copy in conjunction with a linked list structure. A final page is "pre-linked" to an unused disk page so that updating of the read-only shadow copy is achieved at each checkpoint without recopying the entire linked list. U.S. Pat. No. 5,008,786 describes a mechanism for tracking which virtual pages are contained in the checkpointed state. European Patent Specification No. EP-B1-0,119,806 describes a method which allocates a task recovery area in a RAM initially, and deallocates the area in response to deactivation of the task. If a failure occurs data is transferred from the task recovery area to bulk memory. Instructions are embedded in application programs.

Thus, while a good deal of development work had been carried out in checkpointing technology, the necessity arises at each checkpoint to carry out a copy operation of at least some of the data in the relevant data structures. In many instances, this requires valuable processor time and extends the processor response time to a significant extent.

OBJECTS OF THE INVENTION

The invention is directed towards providing a checkpointing method which reduces the amount of copying required, and which in many situations eliminates the need for data copying altogether, thus providing a major speed improvement.

SUMMARY OF THE INVENTION

The invention provides a method of implementing a checkpoint between at least two memory locations, the method comprising the steps of:

determining if a location has been modified by a write operation since the previous checkpoint; and if a location has been so modified, designating the currently active location as a backup location for the fresh checkpoint.

By designating the currently active location as a backup location the need for copying to implement a checkpoint is avoided in most circumstances. This allows almost instantaneous checkpointing.

In one embodiment, said location is designated at the checkpoint as being both active and backup, the other location being non-designated.

Preferably for a first write operation after the checkpoint, the non-designated location is designated as being active and the first and subsequent write operations until the next checkpoint are carried out to it.

In one embodiment, the locations have a granularity of less than or equal to one write operation, thus avoiding the need for copying data at or between checkpoints.

Preferably the locations have a granularity of greater than one write operation, and a copy-on-write operation is performed at a first write operation after a checkpoint.

In another embodiment, the memory locations are on multi-ported memory devices, and copy-on-write operations are performed independently of host processor accesses.

In a further embodiment, the multi-ported memory device is a VRAM, and copy-on-write operations are performed very rapidly using transfer cycles of the VRAM.

Ideally, the method comprises the further steps of storing a modification indicator, updating the indicator response to a first write operation after a checkpoint, and referring to the modification indicator before carrying out subsequent write operations, the indicator being reset at a checkpoint.

In one embodiment, modification indicators for a plurality of memory locations are stored on a resettable memory circuit.

The resettable memory circuit may be a resettable RAM.

In another embodiment, a role indicator is stored to indicate if a location has an active, backup, active and backup, or non-designated current role.

Preferably, the role indicator is stored so that it provides information in combination with the modification indicator. The modification and the role indicators preferably each comprise a single binary bit.

In another embodiment, the method comprises the further step of storing a memory circuit region identifier associated with each modification indicator for independent checkpointing of each region.

Ideally, each region of a memory circuit has a separate modification indicator for each checkpointable data item for independent checkpointing of each region.

Preferably, the role indicator includes additional information to allow for more than one backup location.

In another embodiment, the method comprises the further step of updating a status indicator to indicate if a memory location has been read or modified, the status indicator being reset at each checkpoint.

In a still further embodiment, the checkpoint is implemented in a cached memory arrangement.

BRIEF DESCRIPTION OF THE DRAWINGS

The invention will be more clearly understood from the following description of some embodiments thereof, given by way of example only, with reference to the accompanying drawings, in which:

FIG. 2 is a truth table defining the method;

DETAILED DESCRIPTION OF THE EMBODIMENTS

Figure 1:
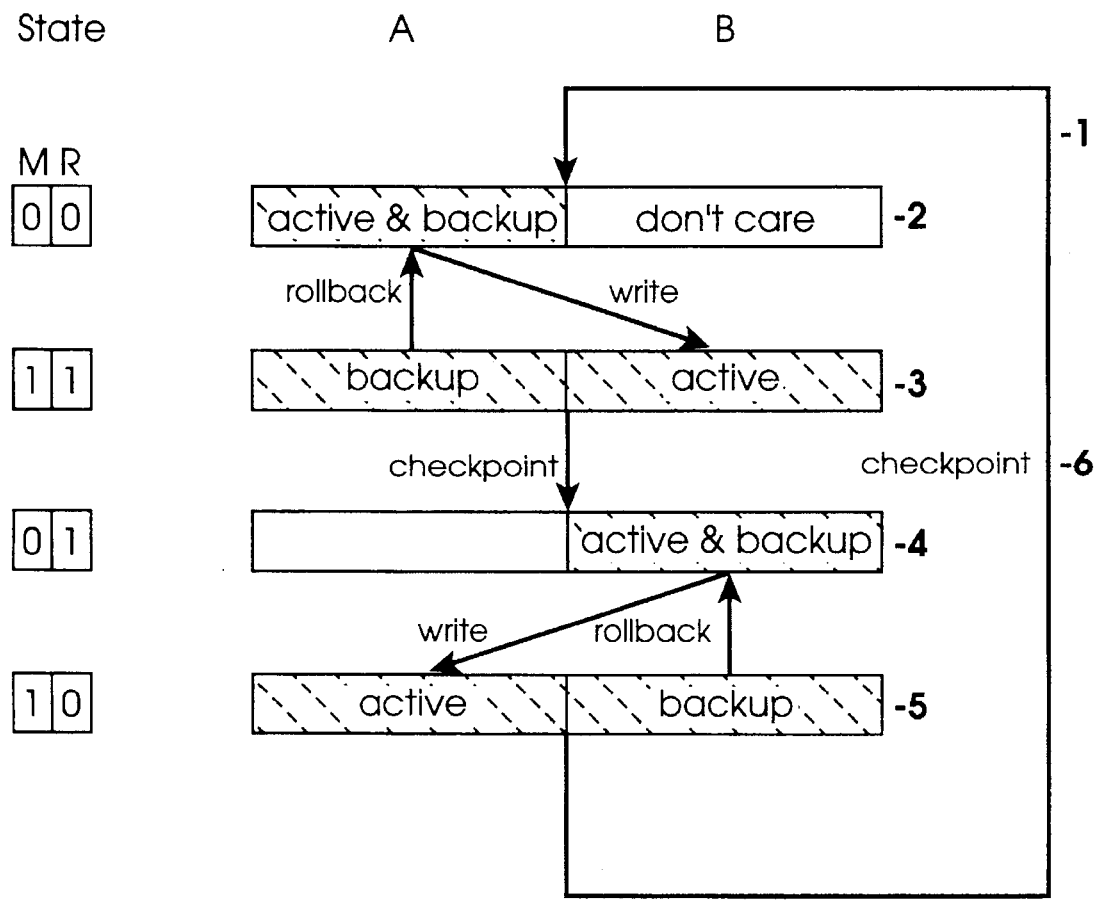
FIG. 1 is a state transition diagram illustrating a checkpointing method of the invention.
Figure 3:
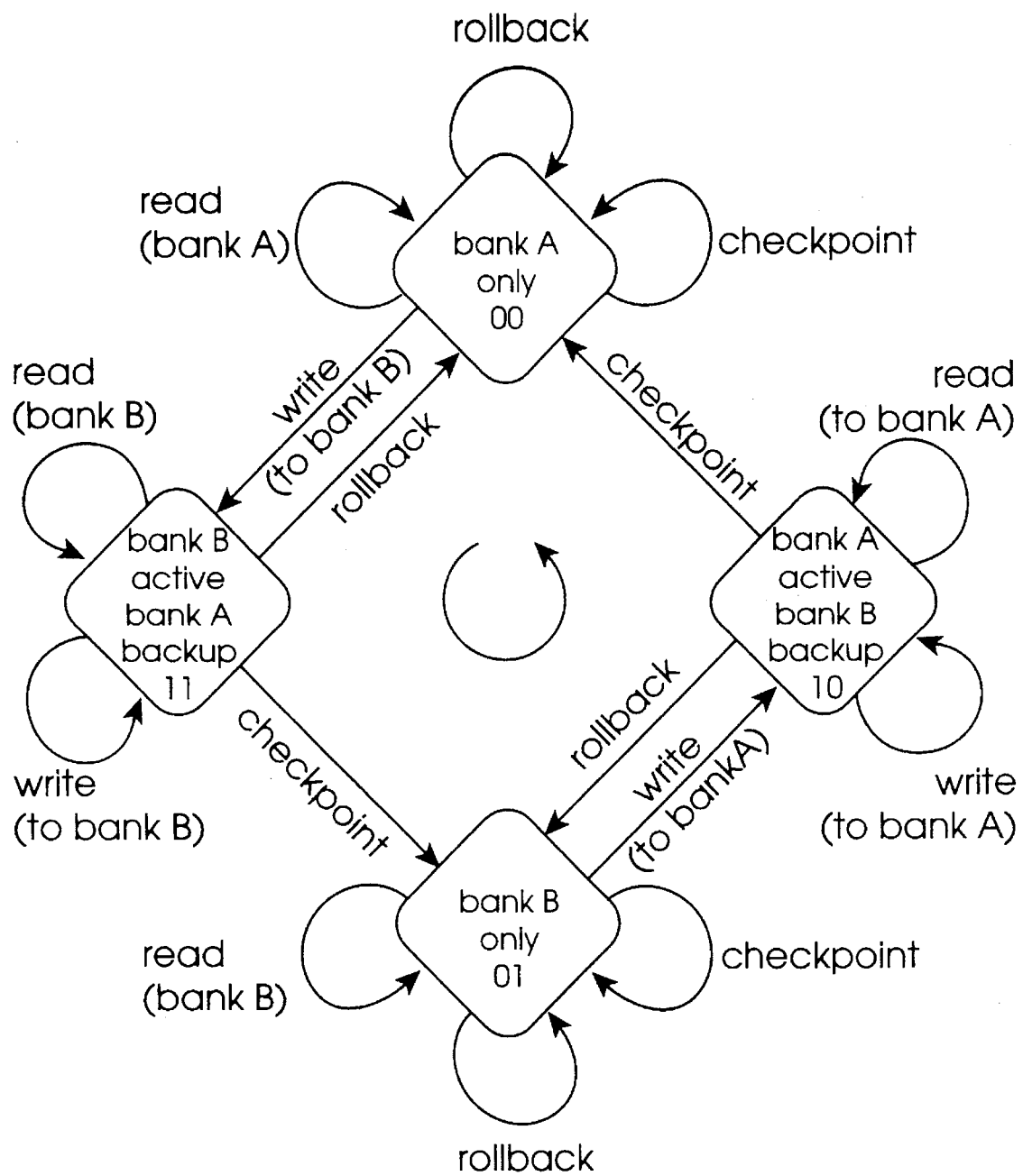
FIG. 3 is an alternative state transition diagram illustrating the method.

FIGS. 1 to 3 illustrate a simple embodiment of the invention in which there are two corresponding memory locations in separate memory banks, A and B. These may be collectively referred to as a "stable location".

Briefly, the location from which data is currently being read is designated the "active location", while that to be used in the event of rollback is designated as the "backup location".

At a checkpoint, copying of the contents of the active location is avoided by simply designating the active location as being both the active and the backup location.

The other of the two locations is non-designated at the checkpoint; reads are then satisfied from the location designated as active and backup.

At the first write operation (if any) after the checkpoint, the non-designated location is designated as the active location and reads and writes then take place to this location, the other remaining as the backup location.

At the next checkpoint, the active location is designated as being both active and backup, the previous backup location becoming non-designated. If, however, there are no writes between the two above-mentioned checkpoints, the designations are not changed.

In FIG. 1, the memory locations are indicated generally by the numeral 1. In addition, there is a modification status indicator bit M, and a role or mode indicator bit R. These two bits together provide the necessary information for implementing the checkpoint.

If M=0 (unmodified, no write since last checkpoint), and R=0, this M value indicates that a single location is both active and backup, and this R value indicates that this location is location A. This is indicated by step 2 of FIG. 1, Reads are then satisfied from location A, and if rollback is required, this also refers to location A. However, location A could not function as a backup location if it were then written to, and accordingly if there is then a write request the M bit is changed to 1 to indicate modification since the previous checkpoint and the R bit is changed to 1 to indicate that location B is now the active location. This is Step 3 of FIG. 1. The write then takes place to location B, as do subsequent reads and writes until the next checkpoint.

The next checkpoint is indicated by 4, and this involves resetting the M bit to 0. The subsequent combined MR value of 01 indicates to the processor that B is both active and backup and reads and writes take place mirroring those described above. Accordingly, after a write (to location A) the M bit is changed to 1 to indicate modification since the previous checkpoint and the R bit is changed to 0 to indicate that A is now active. At the next checkpoint 5, M is reset to 0 and the initial state described above is arrived at.

Of course, as shown in FIGS. 2 and 3, if there is no write between checkpoints the M and R bits are not changed and the single location designated as active and backup remains so. The drawings also demonstrate clearly that second and subsequent writes after a checkpoint do not result in any change of designation.

It will thus be appreciated that checkpointing according to the method of the invention does not involve copying and may therefore be carried out almost instantaneously. It is only required to reset the M bit. This may be done extremely quickly if the M bits are stored on a single, resettable memory circuit such as a resettable static random access memory (SRAM). Such an operation takes less than 50 ns. This is a very important aspect of the invention because of the major advantages achieved.

In modern cache-coherent systems, there still will be no copying even if the M and R bits refer to an amount of data which has a granularity up to that of the cache-to-main memory write operation (a cache line or sub-line).

If the bits M and R refer to an amount of data (for example, a memory page) which has a larger granularity than that of a write operation, then a copy-on-write operation is needed before the write is performed (as described in brackets in the table of FIG. 2). Such copying may, however, be carried out very quickly if a multi-ported memory device such as a Video RAM (VRAM) is used. With a VRAM, transfer cycles may be used for fast copying. With a large granularity, the number of M and R bits required is substantially reduced, thus saving on expense of resettable memory circuits.

Rollback (which is hopefully a much less frequent event than checkpointing) requires the location status array to be scanned and selectively updated (unless the necessary state transformations of the M and R bats cannot be accomplished in parallel by the device in which they are stored).

Not all locations may need to be checkpointed. Those locations that are devoted to program code need only be checkpointed in special systems, such as real-time systems which cannot tolerate the delay of reloading the program code from secondary storage into memory. Only those locations that are stable must be checkpointed. If the memory includes stability flags for each location, then only writes to those locations which are marked as stable are allowed to cause state changes in the M and R bits, and hence only those locations are checkpointed.

Checkpointing is useful as a mechanism for providing fault tolerance and atomicity to software. It is also a useful mechanism for providing tolerance to hardware faults. In a memory system which incorporates error detection and correction circuits checkpointing can be used to provide tolerance to faults that cause incorrectable errors. If further tolerance to hardware faults is required, any of the well known methods for providing this, such as duplexing, triple or N modular redundancy, or distributed architectures may be utilised. For example, three memory boards may work in a triple modular redundancy arrangement. The host processors would broadcast data and commands to all replicas, and would read data from all replicas. If a board detects a difference between the data on the host bus and the data at the input to its output buffers, it would invoke an error handling mechanism. The faulty board would isolate itself from the bus and indicate that it needs repair. In this case, the hardware fault is masked and the checkpointing method is not involved. Other methods might utilize checkpointing.

In the above description, it has been assumed that a switchmode checkpoint has a "global" effect, i.e. in affects all of the memory, or more precisely all checkpointable items in memory. In many circumstances, this is not convenient, particularly where it is desirable to checkpoint different sets of items at different times and frequencies. This can be accommodated by allowing a checkpointable item to exist in one or more checkpointable regions, where each region can be independently checkpointed.

Figure 4:
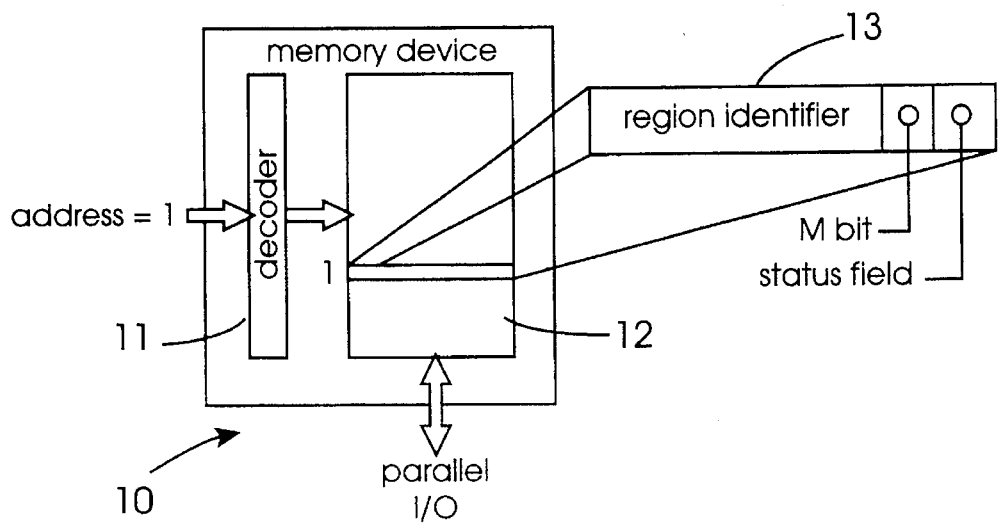
FIGS. 4 and 5 are diagrams showing memory circuits where checkpointable data items are associated with memory regions.

One such embodiment is shown in FIG. 4 in which a memory device 10 having an address decoder 11 and data storage locations 12 is illustrated. Each checkpointable item's M bit can be tagged with a region identifier. When the M bits for a particular region are to be reset (typically at a checkpoint), only those M bits that have the correct tag value are selectively reset. In FIG. 4, the region identifier is indicated by the numeral 13.

Figure 5:
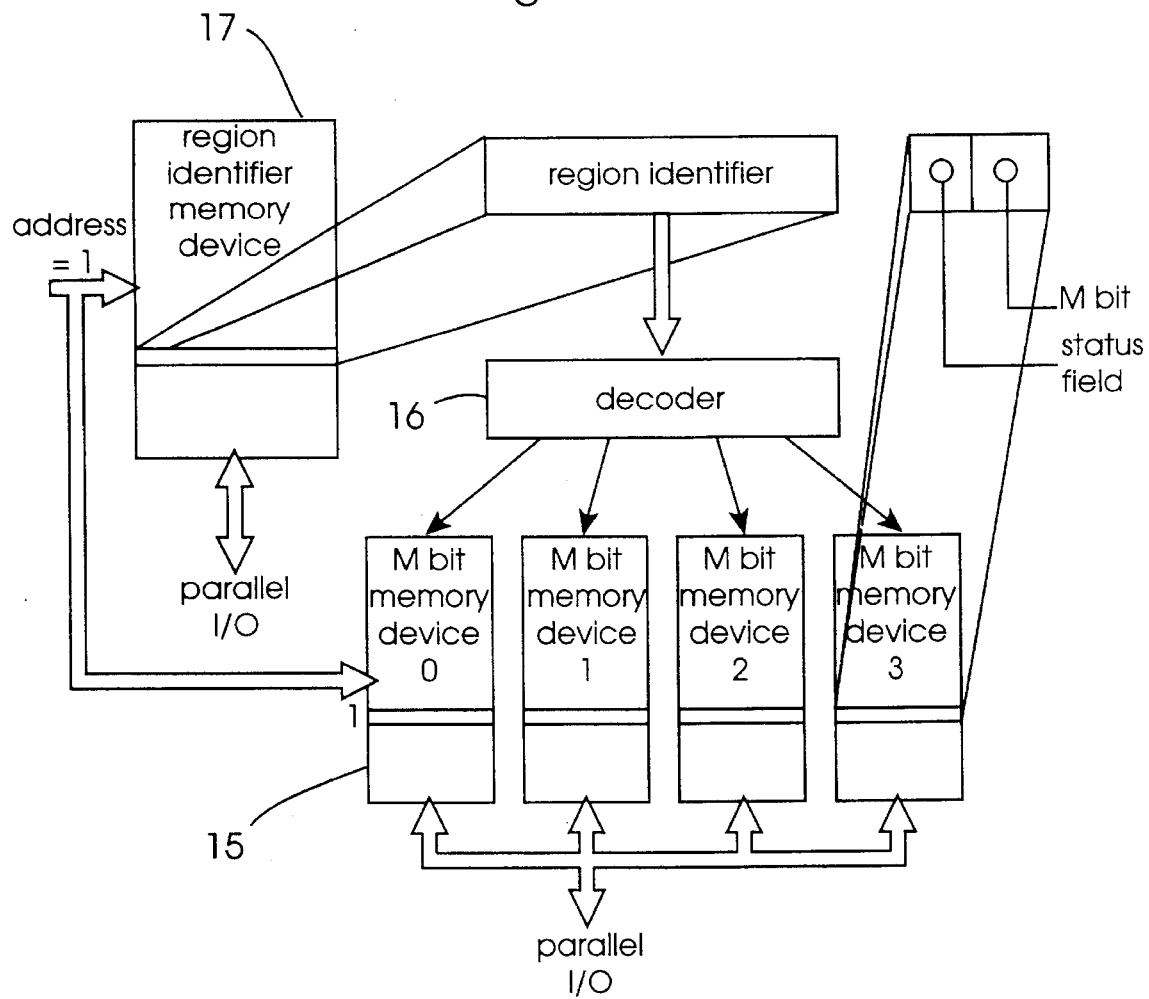

Another embodiment is shown in FIG. 5 in which each region can have a separate M bit per checkpointable item. In this embodiment the M bits for a particular region are reset by resetting a single memory device specific to that region. Such memory devices are indicated by the numeral 15 in FIG. 5 and are selected via a decoder 16 which is fed with the region identifier from a region identifier memory device 17.

Figure 6:
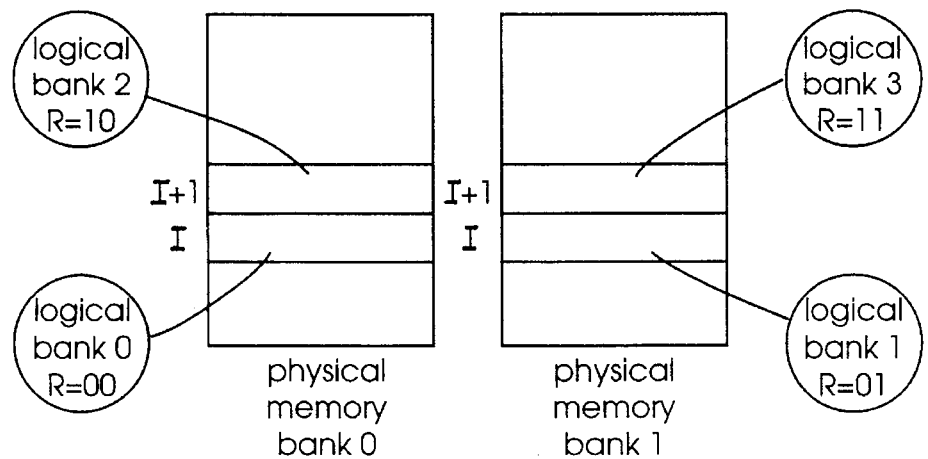
FIG. 6 is a diagram showing how a chain of nested checkpoints are handled.

In some circumstances, it is convenient to maintain not just one checkpoint to return to if so desired but a chain of N checkpoints. This is useful when nesting checkpoints, for example. This can be done by increasing the width of the R field—an N bit R field allows a chain of $(2^N-1)$ checkpoints. For example, 2 R bits allows a chain of 3 checkpoints, plus the active bank. The R field is operated like an N bit wrap-around counter, where the current count indicates the active bank, and counts further back in time indicate checkpoints further back in time. An example for 2 R bits is shown in FIG. 6. This of course requires that there by $2^N$ logical banks of memory, where memory accesses are diverted to a particular bank as determined by the current value of the R field. The logical banks can be distributed amongst the same number or fewer physical banks. Usually two physical banks are sufficient, and even just one will suffice for many applications. In FIG. 6, there are just two physical banks, where each checkpointable location takes up two locations in each physical bank, the four locations representing just one location in four logical banks.

It will be noted that the number of checkpointing regions does not affect the R field, since in the absence of rollback the R field is changed only on memory write accesses, whereas the M bit is only changed at checkpoints. The exception to this is for rollback after faults, but in this case the M and R fields must be adjusted individually for each checkpointable item. Hence only a single R field is needed per checkpointable item.

Between checkpoints, it may be useful to record in a status field whether each checkpointable item has been read or modified. This field must be initialized at the very beginning of each checkpoint interval—in practice it is convenient to clear the field when the M bit cleared. Typically, the status field will consist of more than one bit, with some bits dedicated to optimizing the checkpointing process. For example, the status field might consist of a single bit, S, encoded with the M bit as:

| M | S | Status |
|---|---|--------|
| 0 | 0 | clean |
| 0 | 1 | referenced |
| 1 | 0 | modified |
| 1 | 1 | marked |

"Clean" is the initial status, "referenced" indicates the item has been read, and "modified" means that the item has been altered. "Marked" in this case implies that some special action must be taken for the relevant item.

For each checkpointable item, the status field must be associated with the item's checkpoint region, and the status must be reset whenever the M bit is reset. In the case where the M bits are tagged with the region identifier, the status field can be stored alongside the M bit. If separate resettable memory devices are used to store the M bit for each region, then the status can be restored in the relevant resettable memory device. This is shown in FIGS. 4 and 5.

Figure 7:
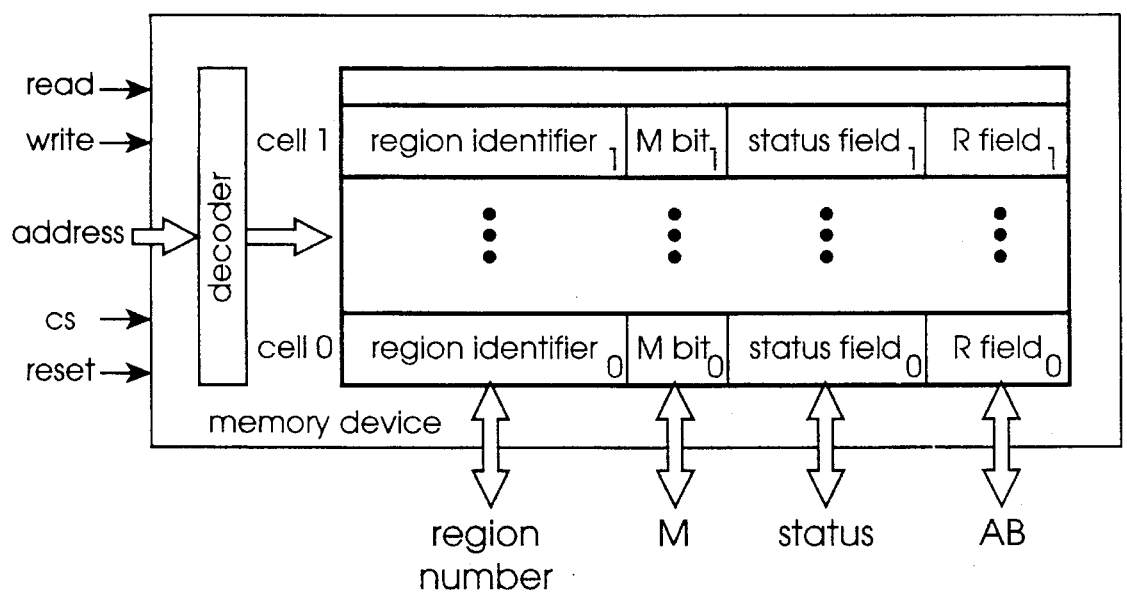
FIG. 7 is a diagram showing a memory circuit for performing checkpointing in which there are region status identifiers.

Referring now to FIG. 7, there is shown a memory circuit of the invention which can perform the checkpointing method very efficiently. This memory stores information in cells—one cell per checkpointable item. Each cell holds its information in four fields:

(a) the R field
(b) the region identifier
(c) the M field
(d) the status field.

As indicated above, each checkpointable item's M bit is tagged with a region identifier. When the item is being allocated to a particular region, the cell for that item is selected by decoding the address input pins, then the region number is written from the region pins into that cell's region identifier. At the same time, initial values for that cell's R, M and status fields are written from the R, M and status pins into that cell. As is conventional for memory devices, the write is performed by activating the write pin, qualified by the CS (chip select) pin.

Subsequent read or write accesses to that item update the R and status fields. Again conventionally, the write is performed by selecting the cell for that item by decoding the address input pins, and activating the write pin, qualified by the CS pin. A read is performed in the same way, but by activating the READ pin rather than the WRITE pin.

When the M bits for a particular region are to be reset (typically at a checkpoint) the region number is fed from the REGION pins into the memory as indicated in FIG. 7 and the RESET input is activated. All cells simultaneously. compare the region number to the value in their region identifier. Any cell where the two values are equal resets its M and status fields. Thus, only those M bits that have the correct tag value are reset and the status field is reset in unison.

If a ROLLBACK input is available, the necessary state transformations could be performed by all cells simultaneously. In the case of one M bit and one R bit:

| if M, R = 00 | do nothing |
| if M, R = 11 | change M, R to 00 |
| if M, R = 01 | do nothing |
| if M, R = 10 | change M, R to 01. |

Extension of the case of more than one M bit and/or more than one R bit will be immediately apparent. The invention may be applied to systems which incorporate caches either locally or remotely. For example, if a checkpoint of a region is invoked by a host processor writing the region identifier to a well known memory address, the processors, caches may use the identifier to checkpoint any cached subsets of that region. At the same time, the memory can use the identifier to checkpoint its copy of the region, and any other host processor caches can similarly checkpoint their cached subsets of the region.

The invention is not limited to the embodiments hereinbefore described, but may be varied in construction and detail.

We claim:

1. A method carried out by a processor for implementing a checkpoint between pairs of memory locations, the method comprising the steps of:

(a) storing in a memory circuit a modification indicator associated with each pair of memory locations, each modification indicator indicating if a write operation has taken place to one of the pairs of memory locations since a previous checkpoint and wherein said memory circuit is resettable such that all modification indicators are simultaneously changed to a default value;

(b) storing a role indicator associated with each said pair of memory locations, each role indicator indicating status of the associated pair of memory locations when read in combination with the associated modification indicator, each said role indicator being stored in a second memory circuit separate from the resettable memory circuit storing the modification indicators;

(c) implementing a current checkpoint for all memory locations by resetting the resettable memory circuit so that all modification indicators have said default value, the role indicators being unchanged at a checkpoint, the combination of role and modification indicators for each pair of locations thereby indicating:

if a location has been modified since the previous checkpoint, that said location now has active and backup status and that the other location of its pair of memory locations is now non-designated, and if neither location has been modified since the previous checkpoint, that the status of both locations is unchanged, and (d) for each memory location pair, at a first write operation to a location of said pair after the current checkpoint:

updating the associated modification indicator to indicate that a write operation has occurred to one of the memory locations;

updating the associated role indicator so that in combination with the modification indicator said role indicator indicates that said non-designated location is changed to active status and that the other location is changed to backup status; and writing data to the active location and subsequently writing data to said active location until the next checkpoint.

2. A method as claimed in claim 1, wherein the modification and the role indicators each comprise a single binary bit, the updating of each indicator involving flipping the binary bit value.

3. A method as claimed in claim 1 wherein said locations have a granularity of less than or equal to one write operation, thus avoiding the need for copying data at or between checkpoints.

4. A method as claimed in claim 1, wherein said locations have a granularity of greater than one write operation, said method further comprising the step of performing a copy-on-write operation at a first write operation after a checkpoint.

5. A method as claimed in claim 4, wherein the memory locations are on multi-ported memory devices, and required copy-on-write operations are performed independently of processor accesses when a memory location has a granularity of greater than one.

6. A method as claimed in claim 4, wherein the memory locations are on a Video RAM (VRAM), and any required copy-on-write operations are very rapidly performed using transfer cycles of the VRAM.

7. A method as claimed in claim 1, further comprising the step of storing a memory circuit region identifier associated with each modification indicator for independent checkpointing of each region.

8. A method as claimed in claim 1, wherein each region of a memory circuit has a separate modification indicator for each checkpointable data item for independent checkpointing of each region.

9. A method as claimed in claim 1, wherein the role indicator includes additional information to allow for more than one backup location.

10. A method as claimed in claim 1 further comprising the step of updating a status indicator to indicate if a memory location has been read or modified, the status indicator being reset at each checkpoint.

11. A method as claimed in claim 1 wherein the checkpoint is implemented in a cached memory arrangement.

12. A method as claimed in claim 1 wherein the resettable memory circuit storing the modification indicators is a resettable random access memory circuit.

* * * * *

UNITED STATES PATENT AND TRADEMARK OFFICE
CERTIFICATE OF CORRECTION

PATENT NO. : 5,574,874
DATED : November 12, 1996
INVENTOR(S) : Jeremy O. Jones, et al.

It is certified that error appears in the above-indentified patent and that said Letters Patent is hereby corrected as shown below:

Column 2, line 21: "indicator response" should read --indicator in response--

Column 3, line 16: ".of" should read --of--

Column 4, line 25: "bats" should read --bits--

Column 4, line 57: "in" should read --it --

Signed and Sealed this

Twenty-third Day of September, 1997

Attest:

BRUCE LEHMAN

*Attesting Officer*    *Commissioner of Patents and Trademarks*